United States Patent
Kim et al.

(10) Patent No.: US 10,275,385 B2
(45) Date of Patent: Apr. 30, 2019

(54) INTEGRATED CIRCUIT SYSTEM

(71) Applicant: SK hynix Inc., Gyeonggi-do (KR)

(72) Inventors: Hong-Sik Kim, Gyeonggi-do (KR); Young-Suk Moon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 69 days.

(21) Appl. No.: 15/441,925

(22) Filed: Feb. 24, 2017

(65) Prior Publication Data

US 2017/0249276 A1     Aug. 31, 2017

(30) Foreign Application Priority Data

Feb. 25, 2016   (KR) .................. 10-2016-0022693
Jan. 10, 2017   (KR) .................. 10-2017-0003486

(51) Int. Cl.
  *G06F 13/42*    (2006.01)
  *G06F 11/07*    (2006.01)
  *G06F 13/16*    (2006.01)

(52) U.S. Cl.
  CPC .......... *G06F 13/42* (2013.01); *G06F 11/0745* (2013.01); *G06F 13/1668* (2013.01)

(58) Field of Classification Search
  CPC .................................................. G06F 13/14
  See application file for complete search history.

(56) References Cited

U.S. PATENT DOCUMENTS

| | | | | |
|---|---|---|---|---|
| 5,666,362 A | * | 9/1997 | Chen ................ | H04Q 11/0428 370/420 |
| 7,412,588 B2 | * | 8/2008 | Georgiou ............ | G06F 15/167 710/306 |
| 8,131,659 B2 | | 3/2012 | Xu et al. | |
| 2009/0292862 A1 | * | 11/2009 | Kitahara ............ | G06F 12/0246 711/103 |
| 2013/0024667 A1 | | 1/2013 | Kyo | |

* cited by examiner

*Primary Examiner* — Henry Tsai
*Assistant Examiner* — Juanito C Borromeo
(74) *Attorney, Agent, or Firm* — IP & T Group LLP (57) ABSTRACT

An integrated circuit system includes a host device; and a memory module suitable for communicating with the host device according to a first protocol, the memory module comprising: at least one memory device suitable for storing data or outputting stored data, and executing communication according to a second protocol; and a protocol converter suitable for transferring information among the host device and the at least one memory device, wherein information to be inputted to the at least one memory device is transferred by being converted according to the second protocol and information to be outputted from the at least one memory device is transferred by being converted according to the first protocol.

19 Claims, 4 Drawing Sheets

| WT_PACK | CODE 1 | CODE 2 | CODE 3 | CODE 4 | CODE 5 | CODE 6 |

| RD_PACK | CODE 1 | CODE 2 | CODE 3 | CODE 5 | CODE 6 |

| RD_BACK_PACK | CODE 1 | CODE 3 | CODE 4 | CODE 5 | CODE 6 |

| ACK_PACK | CODE 1 | CODE 3 | CODE 5 | CODE 7 |

INTEGRATED CIRCUIT SYSTEM

CROSS-REFERENCE TO RELATED APPLICATION

This application claims priority under 35 U.S.C. § 119 to Korean Patent Application No. 10-2016-0022693 filed on Feb. 25, 2016 and Korean Patent Application No. 10-2017-0003486 filed on Jan. 10, 2017, the entire contents of which are incorporated herein by reference.

TECHNICAL FIELD

This patent document relates to an integrated circuit system.

DISCUSSION OF THE RELATED ART

Figure 1:
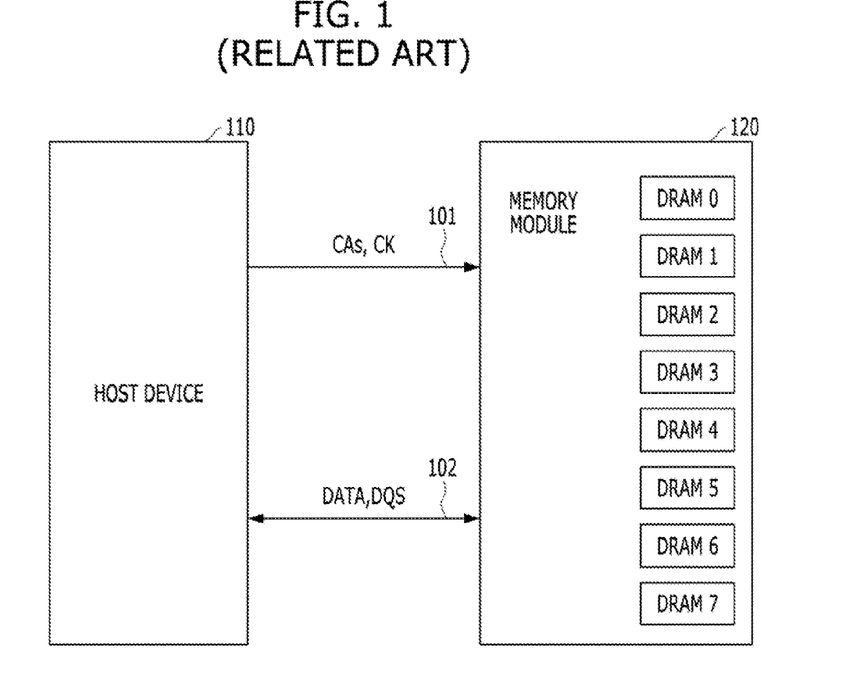
FIG. 1 is a diagram illustrating an example of an integrated circuit system.

FIG. 1 is a diagram illustrating an example of an integrated circuit system.

Referring to FIG. 1, the integrated circuit system may include a host device 110 and a memory module 120.

The host device 110 may be a device such as a central processing unit (CPU), a graphic processing unit (GPU) and a display device. The host device 110 may transmit a plurality of command/address signals CAs to the memory module 120 as the occasion demands, and exchange data DATA with the memory module 120.

The memory module 120 may include a plurality of memory chips DRAM0 to DRAM7. The plurality of memory chips DRAM0 to DRAM7 may store data DATA or output stored data DATA in response to the plurality of command/address signals CAs received by the memory module 120.

Communication of the host device 110 and the memory module 120 may be implemented by a DRAM protocol. A protocol means a set of conventions for various communication rules and methods to smooth information exchange when information exchange is needed between information appliances, that is, a protocol of communication. The DRAM protocol may be a kind of synchronous protocol where signals are inputted/outputted at predetermined times in synchronization with a clock signal. According to the DRAM protocol, the plurality of command/address signals CAs and the data DATA may be transmitted through different buses 101 and 102. The host device 110 may control the operations of the memory module 120 by transmitting, together with a clock CK, the plurality of command/address signals CAs synchronized with the clock CK. The data DATA may be transmitted and received between the host device 110 and the memory module 120 in synchronization with a data strobe signal DQS. However, a limitation exists regarding the kinds of information which may be transmitted by using the DRAM protocol.

SUMMARY

Various embodiments are directed to an integrated circuit system including a host device operatively connected to a memory module, the integrated circuit being capable of performing a communication according to a packet-based protocol between the host device and the memory module. The integrated circuit system may transmit and receive various kinds of information, and may allow the operation of multiple memory devices of the memory module. The integrated circuit system may also be capable of converting information from one protocol to another in the memory module.

Also, various embodiments are directed to an integrated circuit system including a memory module operatively coupled to a host device in which the memory module includes an accelerator capable of supplementing a calculation of the host device, thereby increasing an operation speed of the system.

In an embodiment, an integrated circuit system may include: a host device; and a memory module suitable for communicating with the host device according to a first protocol, the memory module comprising: at least one memory device suitable for storing data or outputting stored data, and executing communication according to a second protocol; and a protocol converter suitable for transferring information among the host device and the at least one memory device, wherein information to be inputted to the at least one memory device is transferred by being converted according to the second protocol and information to be outputted from the at least one memory device is transferred by being converted according to the first protocol.

In an embodiment, an integrated circuit system may include: a host device; and a memory module including at least one memory device and an accelerator, and suitable for: converting information according to a first protocol received from the host device, into information according to a second protocol and transferring the converted information to the memory devices; and converting information according to the second protocol outputted from the memory devices, into information according to the first protocol and transferring the converted information to the host device.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
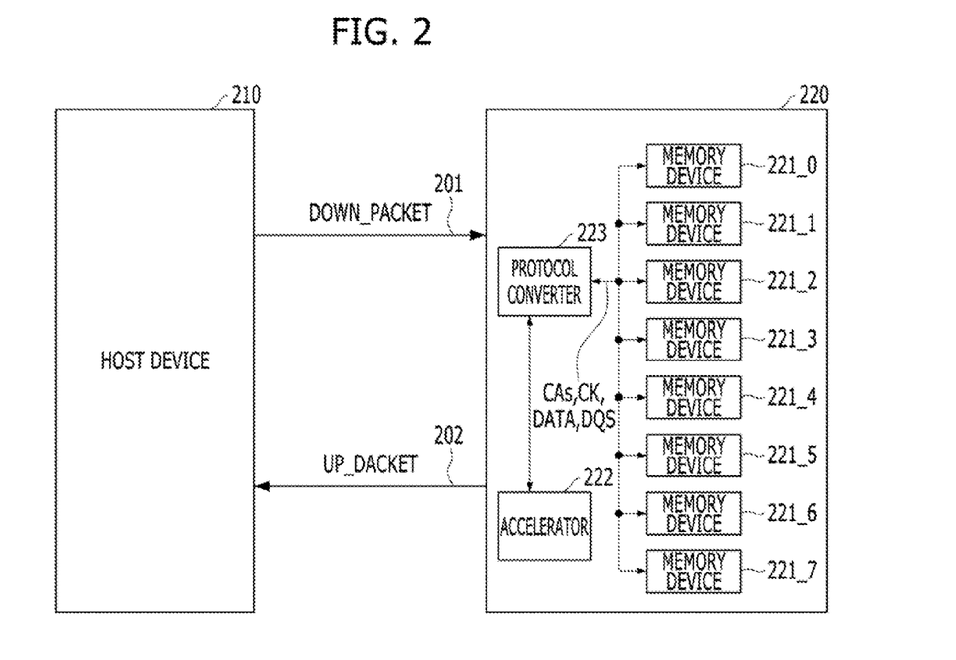
FIG. 2 is a diagram illustrating an integrated circuit system in accordance with an embodiment.

FIG. 2 is a configuration diagram illustrating an integrated circuit system in accordance with an embodiment.

Referring to FIG. 2, the integrated circuit system may include a host device 210 and a memory module 220. The host device 210 may include an electronic circuit such as a central processing unit (CPU) and a graphic processing unit (GPU). The host device 210 may transmit a write request packet information which requests a write operation and a read request packet information which requests a read operation, to the memory module 220, or receive a read response packet information which includes a read operation result or an acknowledgement packet information which indicates whether an error has occurred in the transmission, from the memory module 220.

The memory module 220 may include a plurality of memory devices 221_0 to 221_7, an accelerator 222, and a protocol converter 223.

Information exchange between the host device 210 and the memory module 220 may be performed according to an asynchronous protocol. When the host device 210 and the memory module 220 exchange information, they may exchange the information in the form of packet information including preset codes. Hereinbelow, a protocol used for information exchange between the host device 210 and the memory module 220 will be referred to as a packet protocol, and information exchanged between the host device 210 and the memory module 220 will be referred to as packet information.

More specifically, packet information may include control signals which are transmitted from the host device 210 to one or more of the memory devices 221_0 to 221_7, data transmitted from the host device 210 to one or more of the memory devices 221_0 to 221_7 to be stored in the memory devices 221_0 to 221_7, or data stored in any of the memory devices 221_0 to 221_7 which are transmitted from the memory devices 221_0 to 221_7 to the host device. Packet information may further include control signals transmitted from the host device 210 to the memory module 220 for controlling the accelerator 222 of the memory module 220, data transmitted from the host device 210 to the accelerator 222 to be calculated in the accelerator 222, or data received by the host device 210 from the memory module 220 which are data generated as a result of a calculation in the accelerator 222. In an embodiment, the accelerator 222 may be a field-programmable gate array (FPGA) chip, and the host device 210 may transmit an FPGA image information to the accelerator 222 for programming an FPGA, through a packet information.

The memory module 220 may perform operations of storing data or outputting stored data and of supplementing a calculation operation of the host device 210. In the memory module 220, the operation of storing data or outputting stored data may be performed by the plurality of memory devices 221_0 to 221_7, and the operation of supplementing a calculation operation of the host device 210 may be performed by the accelerator 222. In an embodiment, the memory module 220 may be a dual in-line memory module (DIMM).

In the case where a packet information received according to a packet-based protocol is information for the memory devices 221_0 to 221_7, the protocol converter 223 may convert the packet information into information according to a synchronous protocol and transfer the converted information to the memory devices 221_0 to 221_7. Also, the protocol converter 223 may convert information according to a synchronous protocol outputted from the memory devices 221_0 to 221_7, into packet information according to the packet protocol, and transfer the converted information to the host device 210 as packet information. In the case where packet information is information for the accelerator 222, the protocol converter 223 may convert the packet information into information according to a protocol used by the accelerator 222 and transfer the converted information to the accelerator 222. Also, the protocol converter 223 may convert information outputted from the accelerator 222, into packet information according to the packet protocol, and transfer the converted packet information to the host device 210. In the case where the protocol used by the accelerator 222 is the same as the packet protocol, information may be transferred without protocol conversion.

In some embodiments, information may be exchanged according to the synchronous protocol between the protocol converter 223 and the memory devices 221_0 to 221_7. In detail, the protocol converter 223 may transmit a plurality of command/address signals CAs to the memory devices 221_0 to 221_7 in synchronization with a clock CK, and data DATA may be transferred in synchronization with a data strobe signal DQS between the protocol converter 223 and the memory devices 221_0 to 221_7.

Information exchange between the protocol converter 223 and the memory devices 221_0 to 221_7 may be controlled such that specified information are transferred at specified times. For example, in the case of transferring a write request and write data to the memory devices 221_0 to 221_7, the write data DATA are transferred when a predetermined time passes after the time when the command/address signals CAs corresponding to the write request are transferred. Moreover, in the case of a read request, the memory devices 221_0 to 221_7 may have to output the requested read data DATA when a predetermined time passes after the time when the command/address signals CAs corresponding to the read request are transferred. In the following descriptions, such a synchronous protocol may be referred to as a DRAM protocol. Details for the DRAM protocol are defined in the Joint Electron Device Engineering Council (JEDEC) specification.

In the case where a packet information received according to the packet-based protocol is an information for the accelerator 222, the protocol converter 223 may convert the packet information into an information according to the protocol used in the accelerator 222 and transfer the converted information to the accelerator 222. Also, the protocol converter 223 may convert an information outputted from the accelerator 222, into a packet information according to the packet protocol, and transfer the converted packet information to the host device 210. The accelerator 222 may use one or more various protocols and may transfer an information by using the packet protocol. In the case where the accelerator 222 uses the packet protocol, the protocol converter 223 may transfer a packet information received from the accelerator 222 without protocol conversion.

The plurality of memory devices 221_0 to 221_7 may write received data or read and output stored data, in response to the plurality of command/address signals CAs received from the protocol converter 223. The plurality of command/address signals CAs may include signals (hereinafter, referred to as a command signal) for designating an operation to be performed by the memory devices 221_0 to 221_7 and signals (hereinafter, referred to as an address signal) for selecting a memory device among the memory devices 221_0 to 221_7 and memory cells in the selected memory device to perform the designated operation. That is, the memory devices 221_0 to 221_7 may store data or output stored data, and transmit and receive information by using the DRAM protocol.

The plurality of memory devices 221_0 to 221_7 may write received data in selected memory cells of a memory device selected by the address signal in the case where the command signal corresponds to a write request. Also, the plurality of memory devices 221_0 to 221_7 may read and output data stored in selected memory cells of a memory device selected by the address signal in the case where the command signal corresponds to a read request.

The accelerator 222 may perform a predetermined calculation by using a packet information received through the protocol converter 223 from the host device 210, and transmit a calculation result through the protocol converter 223 to the host device 210. The accelerator 222 may play the role of supplementing a calculation of the host device 210 by performing a part of the calculation performed by the host device 210.

In some embodiments, the accelerator 222 may be configured by a circuit which is programmed by an FPGA chip, or be configured by a dedicated hardware accelerator for performing a predetermined function. In the case of the former, a calculation performed by the accelerator 222 may be changed depending on which FPGA image is used to program the FPGA chip of the accelerator 222 is programmed by which FPGA image. In the case of the latter, the accelerator 222 may perform only the predetermined calculation of the dedicated hardware accelerator.

An FPGA is a non-memory semiconductor in which circuits may be configured several times, unlike a general semiconductor in which a circuit change is impossible. In the case of the FPGA, correction is possible when an error occurs, a development time is short, and initial development costs less. The FPGA is fabricated to finally verify the operation and performance of a hardware designed in advance, immediately before the hardware is manufactured as a semiconductor. Since a user may use the FPGA by programming it in conformity with a need, the FPGA may be regarded an application-specific semiconductor (ASIC).

The accelerator 222 may perform a calculation operation by using the data written by a write request packet information, and output a calculation result through a read packet information which is generated by using a result of performing the calculation operation. The accelerator 222 may perform at least one of a sorting calculation, a searching calculation, a logic calculation and a four arithmetic calculation. The logic calculation may represent a calculation performed by various logic gates such as an AND gate, an OR gate, an XOR gate, a NOR gate and a NAND gate, or a calculation operation in which at least two of such calculations are combined. A calculation operation performed by the accelerator 222 is not limited to the above examples, and may be a calculation corresponding to some other calculation performed by the host device 210.

In the case of the integrated circuit system of FIG. 2, the communication between the host device 210 and the memory module 220 may be performed according to the packet protocol to allow various types of packet information to be transferred, and protocol conversion is implemented in the memory module 220 to communicate with the memory devices 221_0 to 221_7 or the accelerator 222 to thereby allow the memory module 220 to effectively perform the roles of both a data storage and an accelerator.

A bus 201 may transfer a first packet information DOWN_PACKET to be transmitted from the host device 210 to the memory module 220. A bus 202 may transfer second packet information UP_PACKET to be transmitted from the memory module 220 to the host device 210. In some embodiments, the bus 201 and the bus 202 may be separated from each other as shown in FIG. 2. Alternatively, the first and second packet information DOWN_PACKET and UP_PACKET may be transferred through the same bus.

Figure 3:
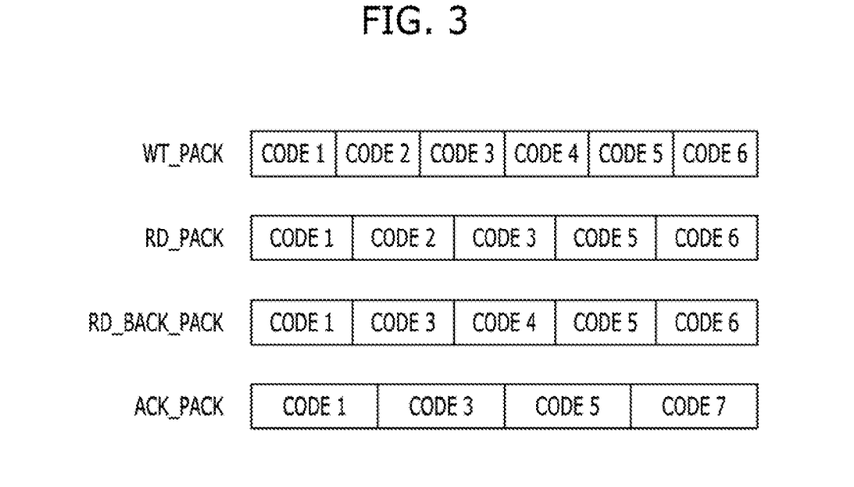
FIG. 3 is a diagram illustrating packet information transferred between a host device and a memory module.

FIG. 3 is a diagram illustrating packet information transferred between the host device 210 and the memory module 220 in FIG. 2.

Referring to FIG. 3, a packet information may include a write request packet information WT_PACK which requests a write operation, a read request packet information RD_PACK which requests a read operation, a read response packet information RD_BACK_PACK which includes a read operation result, or an acknowledgement packet information ACK_PACK which indicates whether an error has occurred or not.

A packet information may include one or more codes among first to seventh codes CODE1 to CODE7. The first to seventh codes may be single-bit or multi-bit information. Each of the first to seventh codes may include an information defined to correspond to it.

A first code CODE1 may include an at least 1-bit information corresponding to a command. A command may be a code for distinguishing a request for the memory devices 221_0 to 221_7 or the accelerator 222. In the example illustrated in FIG. 3, the first code CODE1 may have different values in the respective cases where a packet information corresponds to a write request, or a read request, or a response to a read request, or an error checking request. In an embodiment, the first code CODE1 may be a 2-bit information. The number of bits included in the first code CODE1 may be set differently depending on the number of requests to be represented by the first code CODE1.

A second code CODE2 may include an at least 1-bit information corresponding to an address. An address may be a signal for selecting a device which performs a request included in a packet information and a position where the request is performed in the device. The address may indicate whether a packet information is for the memory devices 221_0 to 221_7 or the accelerator 222. The address may further indicate for which memory device among the plurality of memory devices 221_0 to 221_7 the packet information is, in the case where the packet information is for the memory devices 221_0 to 221_7. The address may further indicate for which position in a memory device or the accelerator 222 the packet information is. In other words, a request corresponding to the first code CODE1 may be performed for a corresponding position of a device corresponding to the second code CODE2. For example, in the case where the first code CODE1 corresponds to a write request, data may be written at a selected position of a device selected by the second code CODE2.

A third code CODE3 may include an at least 1-bit information which is used to check the validity of a packet information and detect an error. A method for detecting an error of a packet information may be cyclical redundancy check (CRC) as one of methods that are widely used in the art. The cyclical redundancy check has a characteristic that an error of data is detected mathematically, and determines whether an error has occurred or not, by using a check value, when detecting an error. The third code CODE3 may be an information (that is, a check value) needed for the cyclical redundancy check.

A fourth code CODE4 may correspond to data. In the case where a packet information corresponds to the memory devices 221_0 to 221_7, data may be data to be written in the memory devices 221_0 to 221_7 or data read from the memory devices 221_0 to 221_7. In the case where a packet information corresponds to the accelerator 222, data may be data needed for a calculation operation to be performed by the accelerator 222 or data for a calculation result generated as a result of performing the calculation operation by the accelerator 222. Data needed for calculation may include data for designating a kind of calculation, data as a target of calculation, and so on.

A fifth code CODE5 may correspond to an identifier (ID) of a packet information. All packet information transferred between the host device 210 and the memory module 220 have intrinsic IDs. This is to distinguishably process the respective packet information. The write request packet information WT_PACK and the read request packet information RD_PACK as packet information transmitted from the host device 210 to the memory module 220 may have intrinsic IDs which are generated by the host device 210. The read response packet information RD_BACK_PACK and the acknowledgement packet information ACK_PACK as packet information transmitted from the memory module 220 to the host device 210 may have the same IDs as corresponding packet information among the packet information transmitted from the host device 210. In this regard, having the same IDs may mean that the values of the fifth code CODE5 are the same.

For example, the acknowledgement packet information ACK_PACK which is generated in correspondence to a certain write request packet information WT_PACK and includes error information on the write request packet information WT_PACK may have the same ID as the write request packet information WT_PACK. For another example, the acknowledgement packet information ACK_PACK which is generated in correspondence to a certain read request packet information RD_PACK and includes error information on the read request packet information RD_PACK may have the same ID as the read request packet information RD_PACK. For still another example, a read response packet information RD_BACK_PACK which is generated in response to a certain read request packet information RD_PACK and includes data read by the read request packet information RD_PACK may have the same ID as the read request packet information RD_PACK.

A sixth code CODE6 may represent a source of a packet information. A source of a packet information may be the host device 210 or the accelerator 222.

A seventh code CODE7 may correspond to a result of detecting whether an error has occurred in a packet information. The seventh code CODE7 may include a 1-bit information, and the 1-bit information may have the value of '0' or '1' depending on whether a corresponding packet information includes an error or not. For example, the seventh code CODE7 may have the value of '0' in the case where an error is not detected in a corresponding packet information, and have the value of '1' in the case where an error is detected in a corresponding packet information.

The write request packet information WT_PACK may include the first code CODE1, the second code CODE2, the third code CODE3, the fourth code CODE4, the fifth code CODE5 and the sixth code CODE6. The read request packet information RD_PACK may include the first code CODE1, the second code CODE2, the third code CODE3, the fifth code CODE5 and the sixth code CODE6. The read response packet information RD_BACK_PACK may include the first code CODE1, the third code CODE3, the fourth code CODE4, the fifth code CODE5 and the sixth code CODE6. The acknowledgement packet information ACK_PACK may include the first code CODE1, the third code CODE3, the fifth code CODE5 and the seventh code CODE7.

The packet information described above are examples of information to be transmitted and received through the packet protocol, and different kinds of packet information which are different from the above-described packet information may be used depending on particulars defined in the packet protocol.

Figure 4:
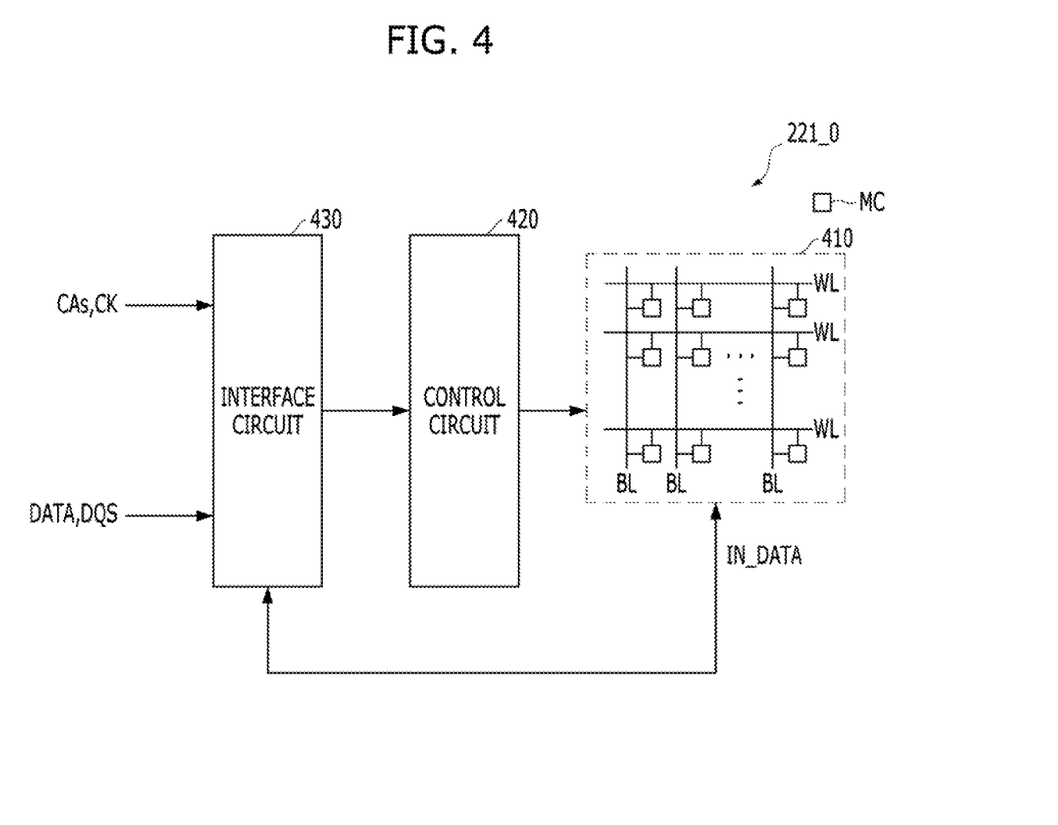
FIG. 4 is a diagram illustrating an exemplary configuration of a memory device employed in the integrated circuit system of FIG. 2.

FIG. 4 is a diagram illustrating an exemplary configuration of the memory device 221_0 of FIG. 2.

Referring to FIG. 4, the memory device 221_0 may include a cell array 410, a control circuit 420, and an interface circuit 430.

The cell array 410 may include a plurality of word lines WL, a plurality of bit lines BL, and a plurality of memory cells MC. Each memory cell MC may store 1-bit data or multi-bit data.

The interface circuit 430 may play the role of transferring signals between an interior and an exterior of the memory device 221_0. The interface circuit 430 may receive the plurality of command/address signals CAs and transfer them to the control circuit 420 in synchronization with the clock CK. Also, the interface circuit 430 may receive data DATA and transfer the data DATA to the cell array 410 in synchronization with the data strobe signal DQS, or output data outputted from the cell array 410, to the exterior of the memory device 221_0 in synchronization with the data strobe signal DQS.

The control circuit 420 may control the operation of the cell array 410 in response to the plurality of command/address signals CAs received through the interface circuit 430. The control circuit 420 may control the cell array 410 such that data DATA received through the interface circuit 430 in response to the plurality of command/address signals CAs corresponding to a write request is written in one or more memory cells selected by the plurality of command/address signals CAs among the plurality of memory cells included in the cell array 410. Moreover, the control circuit 420 may control the cell array 410 such that data DATA of one or more memory cells selected by the plurality of command/address signals CAs among the plurality of memory cells included in the cell array 410 is read in response to the plurality of command/address signals CAs corresponding to a read request, and may cause the read data to be outputted to the exterior of the memory device 221_0 through the interface circuit 430.

While FIG. 4 illustrates only the configuration and operation of the memory device 221_0 in FIG. 2, it is to be noted that the configurations and operations of the remaining memory devices 221_1 to 221_7 in FIG. 2 may be the same as the configuration and operation of the memory device 221_0. In FIG. 4, data transferred inside the memory device 221_0 is designated by the reference symbol 'IN_DATA.'

Figure 5:
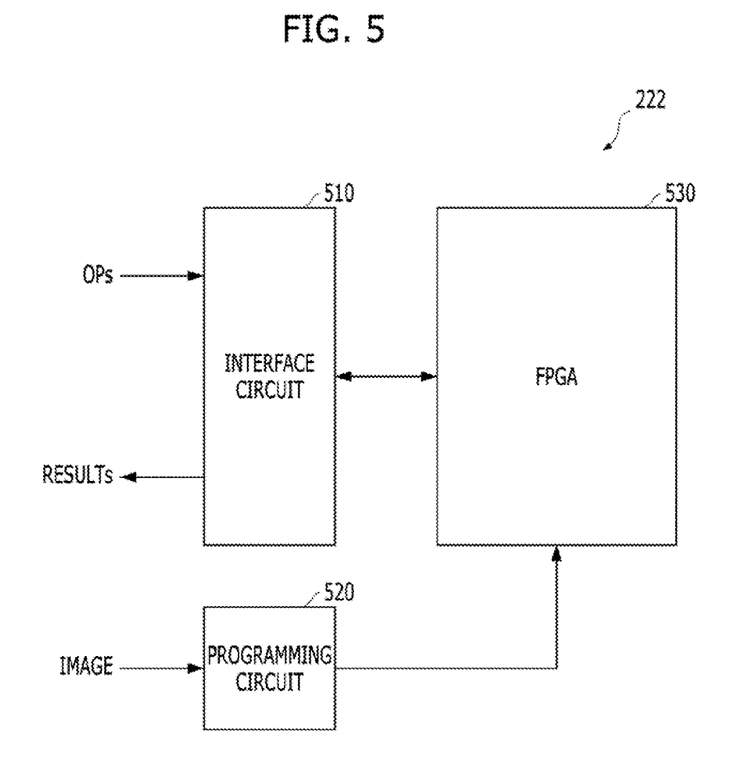
FIG. 5 is a diagram illustrating an exemplary configuration of an accelerator employed in the integrated circuit system of FIG. 2 in accordance with an embodiment.

FIG. 5 is a diagram illustrating an exemplary configuration of the accelerator 222 of FIG. 2 in accordance with an embodiment. FIG. 5 illustrates a case where the accelerator 222 is configured using an FPGA chip.

Referring to FIG. 5, the accelerator 222 may include an interface circuit 510, a programming circuit 520, and an FPGA 530.

The interface circuit 510 may transfer information between the protocol converter 223 and the FPGA 530. The interface circuit 510 may transfer calculation information OPs received from the protocol converter 223, to the FPGA 530, and transfer result information RESULTs outputted from the FPGA 530, to the protocol converter 223.

The calculation information OPs may be generated by the protocol converter 223 by converting packet information which is received from the host device 210 and which is for the accelerator 222, according to the protocol used in the accelerator 222. The calculation information OPs may include a code including information which indicates what a request received from the host device 210 is, a code including information which indicates a position to perform the request, a code including data to be processed by the accelerator 222, a code including information which indicates the size of the data to be processed by the accelerator 222, and a code which indicates an identifier (ID) of the packet information.

The result information RESULTs may be generated by converting packet information corresponding to the accelerator 222, according to the protocol used in the accelerator 222. The result information RESULTs may include a code including information which indicates what a request received from the host device 210 is, a code including information which indicates a position to perform the request, a code including result data of performing a calculation by the accelerator 222, a code including information which indicates the size of the result data of performing the calculation by the accelerator 222, and a code which indicates an identifier (ID) of the packet information.

The programming circuit 520 may store FPGA image data IMAGE received from the protocol converter 223, and program the FPGA 530 according to the FPGA image data IMAGE. The FPGA image data IMAGE may be generated by mixing through a register transfer level (RTL) design or through upper level compiling after coding software (SW) kernel and hardware (HW) kernel by using open computing language (CL). The programming circuit 520 may include a static random access memory (SRAM) to store the FPGA image data IMAGE.

The FPGA 530 may be programmed, before performing a calculation operation, by the programming circuit 520 according to the FPGA image data IMAGE stored in the programming circuit 520 such that the FPGA 530 may perform a specified calculation. After programming is completed, the FPGA 530 may process calculation of data to calculate, included in the calculation information OPs received through the interface circuit 510. If the calculation is completed, the FPGA 530 may include result data thereof in the result information RESULTs, and transfer the result information RESULTs to the protocol converter 223 through the interface circuit 510.

As shown in FIG. 5, in the case where the accelerator 222 is configured by an FPGA chip, the accelerator 222 may perform not only a fixed calculation but also various calculation operations by programming the FPGA 530 through downloading various FPGA image data IMAGE depending on a user's setting. In other words, it is possible to utilize the accelerator 222 not only for one function but for various functions.

Figure 6:
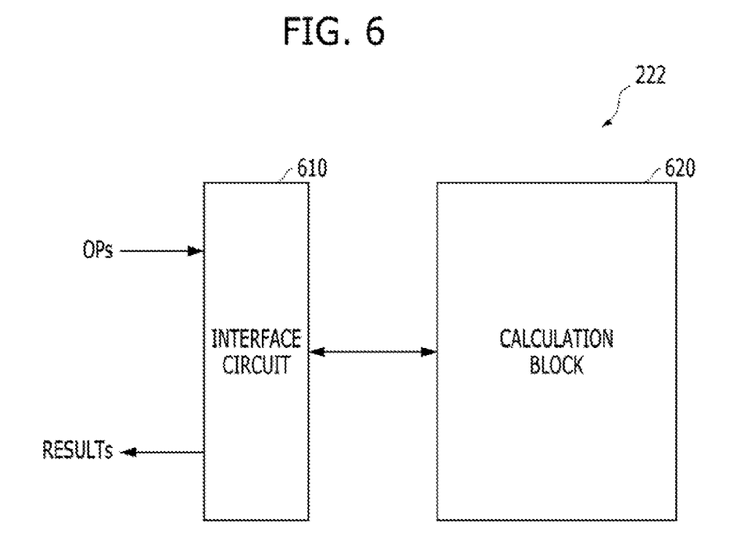
FIG. 6 is a diagram illustrating an exemplary configuration of an accelerator employed in the integrated circuit system of FIG. 2 in accordance with another embodiment.

FIG. 6 is a diagram illustrating another exemplary configuration of the accelerator 222 of FIG. 2. FIG. 6 illustrates the case where the accelerator 222 is configured using a dedicated hardware accelerator.

Referring to FIG. 6, the accelerator 222 may include an interface circuit 610 and a calculation block 620.

The interface circuit 610 may perform the same operation as the interface circuit 510 of FIG. 5. The calculation block 620 may perform a similar operation to the FPGA 530 of FIG. 5. However, unlike the FPGA 530, the calculation block 620 may not be changed in its circuit structure and calculation function depending on a programming, and may have a fixed circuit structure and perform a fixed calculation function. The calculation block 620 may perform one or more functions among various calculation functions performed by the host device 210. For example, the accelerator 222 may perform at least one calculation among a sorting calculation, a searching calculation, a logic calculation and arithmetic calculations.

Figure 7:
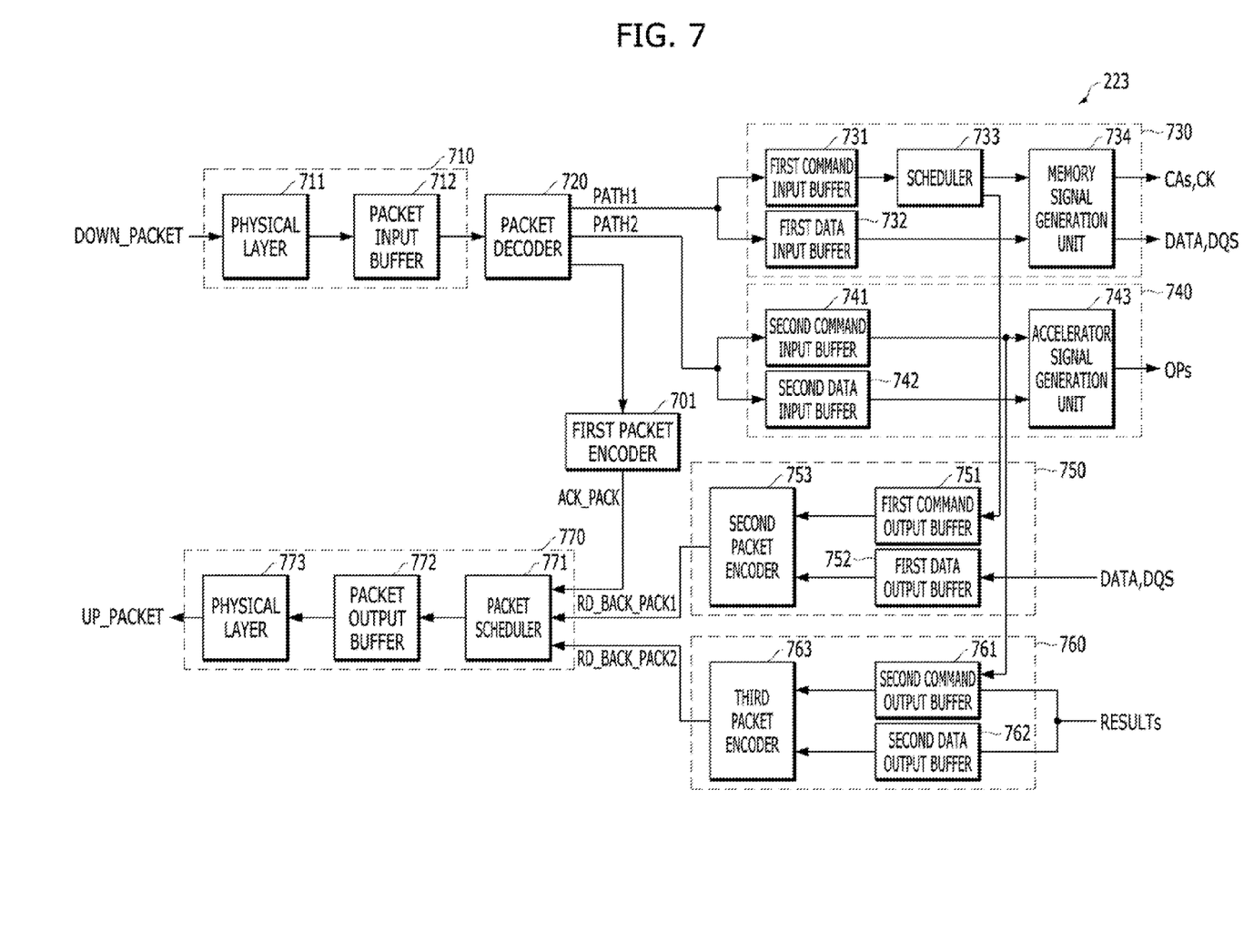
FIG. 7 is a diagram illustrating an exemplary configuration of a protocol converter employed in the integrated circuit system of FIG. 2 in accordance with an embodiment.

FIG. 7 is a diagram illustrating an exemplary configuration of the protocol converter 223 of FIG. 2.

Referring to FIG. 7, the protocol converter 223 may include an input block 710, a packet decoder 720, a first conversion block 730, a second conversion block 740, a third conversion block 750, a fourth conversion block 760, an output block 770, and a first packet encoder 701.

The input block 710 may store packet information received from the host device 210. The input block 710 may include a physical layer 711 which is needed to receive the packet information DOWN_PACKET and a packet input buffer 712 for storing the inputted or received packet information DOWN_PACKET. The packet input buffer 712 may buffer inputted packet information and output the buffered packet information to the packet decoder 720, for example, in a first-in first-out (FIFO) scheme.

The packet decoder 720 may analyze packet information inputted thereto, and inspect the validity of the inputted packet information by performing cyclical redundancy check (CRC) for the packet information by using the third code CODE3 included in the packet information. In the case where the packet information is valid (that is, an error is not included in the packet information), by analyzing the second code CODE2 of the packet information, the packet decoder 720 may output a decoding result to a first path PATH1 or a second path PATH2. The packet decoder 720 may output the decoding result to the first path PATH1 when the packet information corresponds to the memory devices 221_0 to 221_7. The packet decoder 720 may output the decoding result to the second path PATH2 when the packet information corresponds to the accelerator 222.

In the case where the packet information is not valid (that is, an error is included in the packet information), the packet decoder 720 may transfer the ID, corresponding to the fifth code CODE5, of the packet information including the error, to the first packet encoder 701 such that the first packet encoder 701 generates an acknowledgement packet information corresponding to the corresponding packet information. The first packet encoder 701 may generate the acknowledgement packet information ACK_PACK including the seventh code CODE7 indicating whether an error exists in the packet information.

The packet decoder 720 may determine, according to the source information of the sixth code CODE6 included in the packet information, whether to return a result of accessing the memory devices 221_0 to 221_7 to the host device 210 or the accelerator 222. The result of accessing the memory devices 221_0 to 221_7 may be transmitted to the host device 210 in the case where the source of the source information of the sixth code CODE6 included in the packet information is the host device 210. The result of accessing the memory devices 221_0 to 221_7 may be transmitted to the accelerator 222 in the case where the source of the source information of the sixth code CODE6 included in the packet information is the accelerator 222.

The first conversion block 730 may generate command/address signals CAs and data DATA according to a second protocol by using the decoding result of the first path PATH1, and output the command/address signals CAs and the data DATA. The first conversion block 730 may include a first command input buffer 731, a first data input buffer 732, a scheduler 733, and a memory signal generation unit 734.

The first command input buffer 731 may store the first code CODE1, the second code CODE2, the fifth code CODE5 and the sixth code CODE6 among the codes included in the packet information, and transfer the stored codes to the scheduler 733. The first data input buffer 732 may store write data, corresponding to the fourth code CODE4, in the case where the packet information is the write request packet information WT_PACK, and transfer the stored data to the memory signal generation unit 734. The scheduler 733 may select an appropriate command among the first codes CODE1, that is, commands, received through the first command input buffer 731, and transfer the selected command to the memory signal generation unit 734. In the case where the command is a command corresponding to the read request packet information RD_PACK, the scheduler 733 may cause the fifth code CODE5 and the sixth code CODE6 of the read request packet information RD_PACK to be stored in a first command output buffer 751. The memory signal generation unit 734 may generate the plurality of command/address signals CAs, the clock CK, the data DATA and the data strobe signal DQS for controlling a memory device, by using the information received from the scheduler 733 and the first data input buffer 732. The data DATA and the data strobe signal DQS may be generated only in the case where the packet information is the write request packet information WT_PACK.

The second conversion block 740 may generate the information OPs for controlling the accelerator 222, by using the decoding result of the second path PATH2, and output the generated information OPs. The second conversion block 740 may include a second command input buffer 741, a second data input buffer 742, and an accelerator signal generation unit 743.

The second command input buffer 741 may store the first code CODE1, the second code CODE2, the fifth code CODE5 and the sixth code CODE6 among the codes included in the packet information, and transfer the stored codes to the accelerator signal generation unit 743. In the case where the command is a command corresponding to the read request packet information RD_PACK, the second command input buffer 741 may cause the fifth code CODE5 and the sixth code CODE6 of the read request packet information RD_PACK to be stored in a second command output buffer 761. The second data input buffer 742 may store write data, corresponding to the fourth code CODE4, in the case where the packet information is the write request packet information WT_PACK, and transfer the stored data to the accelerator signal generation unit 743. The accelerator signal generation unit 743 may generate the calculation information OPs for controlling the accelerator 222, by using the information received from the second command input buffer 741 and the second data input buffer 742.

The third conversion block 750 may generate information according to a first protocol, by using the data according to the second protocol, outputted from the memory devices 221_0 to 221_7. The third conversion block 750 may include the first command output buffer 751, a first data output buffer 752, and a second packet encoder 753.

The first command output buffer 751 may store the fifth and sixth codes CODE5 and CODE6 stored when the read request packet information RD_PACK is outputted to a memory device, and output the stored codes to the second packet encoder 753. The first data output buffer 752 may store the data DATA received from the memory devices 221_0 to 221_7 in synchronization with the data strobe signal DQS received from the memory devices 221_0 to 221_7, and output the stored data to the second packet encoder 753. The second packet encoder 753 may generate a read response packet information RD_BACK_PACK1 based on the information received from the first command output buffer 751 and the first data output buffer 752, and transfer the read response packet information RD_BACK_PACK1 to the output block 770.

The fourth conversion block 760 may generate packet information according to the first protocol, by using the information RESULTs outputted from the accelerator 222. The fourth conversion block 760 may include the second command output buffer 761, a second data output buffer 762, and a third packet encoder 763.

The second command output buffer 761 may store the fifth and sixth codes CODE5 and CODE6 or some codes of the result information RESULTs stored when the read request packet information RD_PACK is outputted to a memory device, and output the stored codes to the third packet encoder 763. The second data output buffer 762 may store a portion corresponding to data among the result information RESULTs received from the accelerator 222, and output the stored data to the third packet encoder 763. The third packet encoder 763 may generate a read response packet information RD_BACK_PACK2 based on the information received from the second command output buffer 761 and the second data output buffer 762, and transfer the read response packet information RD_BACK_PACK2 to the output block 770.

The output block 770 may transmit the information generated in the third and fourth conversion blocks 750 and 760, to the host device 210. The output block 770 may include a packet scheduler 771, a packet output buffer 772 for storing the packet information UP_PACKET to output, and a physical layer 773 for transmitting the packet information UP_PACKET. The packet output buffer 772 may buffer packet information to output and output the buffered packet information to the physical layer 773, for example, in the first-in first-out (FIFO) scheme.

The packet scheduler 771 may select one among the packet information ACK_PACK, RD_BACK_PACK1 and RD_BACK_PACK2 received from the first to third packet encoders 701, 753 and 763, respectively, and transfer the selected packet information to the packet output buffer 772 or the packet decoder 720. By checking the sixth code CODE6 of the packet information, the packet scheduler 772 may transfer the packet information to the packet output buffer 772 in the case where the source of the packet information is the host device 210, and transfer the packet information to the packet decoder 720 in the case where the source of the packet information is the accelerator 222.

In the embodiment illustrated in FIG. 7, the protocol converter 223 may transfer information not only between the memory devices 221_0 to 221_7 and the host device 210 and between the accelerator 222 and the host device 210 but also between the memory devices 221_0 to 221_7 and the accelerator 222. While descriptions were made above with reference to FIG. 7 for the case where the packet decoder 720 and the second packet encoder 753 are passed through when transferring information between the memory devices 221_0 to 221_7 and the accelerator 222, it is to be noted that, depending on a design, information may be transferred directly through only the first conversion block 730 without passing through the packet decoder 720 and the second packet encoder 753.

In the present technology, in an integrated circuit system, communication may be performed according to a packet-based protocol between a host device and a memory module to transmit and receive various informations, and memory devices may also use various informations, by converting protocols in the memory module.

Furthermore, in the present technology, the memory module includes an accelerator therein to supplement the calculations of a host device, thereby improving the performance of the integrated circuit system.

Although various embodiments have been described for illustrative purposes, it will be apparent to those skilled in the art that various changes and modifications may be made without departing from the spirit and scope of the invention as defined in the following claims.

What is claimed is:

1. An integrated circuit system comprising:
   a host device; and
   a memory module suitable for communicating with the host device according to a first protocol,
   the memory module comprising:
     at least one memory device suitable for storing data or outputting stored data, and executing communication according to a second protocol; and
     a protocol converter suitable for transferring information among the host device and the at least one memory device, wherein information to be inputted to the at least one memory device is transferred by being converted according to the second protocol and information to be outputted from the at least one memory device is transferred by being converted according to the first protocol,
   wherein information transferred between the host device and the memory module comprises a write request packet information which requests a write operation, and
   the write request packet information comprises a first code corresponding to a command, a second code corresponding to an address, a third code for checking validity, a fourth code corresponding to data, a fifth code corresponding to an identifier (ID) of packet information, and a sixth code indicating a source of the packet information.

2. The integrated circuit system according to claim 1, wherein the first protocol is an asynchronous protocol, and the second protocol is a synchronous protocol.

3. The integrated circuit system according to claim 1, wherein the memory module further comprises an accelerator suitable for performing a calculation operation and the protocol converter is further suitable for transferring information between the host device, the accelerator and the at least one memory device.

4. The integrated circuit system according to claim 3, wherein the host device comprises a central processing unit (CPU) and the accelerator comprises a circuit which is obtained by programming a field-programmable gate array (FPGA) chip.

5. The integrated circuit system according to claim 3, wherein the accelerator comprises a dedicated hardware accelerator which performs a predetermined function.

6. The integrated circuit system according to claim 1, wherein the information transferred between the host device and the memory module further comprises a read request packet information which requests a read operation, a read response packet information which includes a read operation result, and an acknowledgement packet information which indicates whether an error has occurred or not.

7. The integrated circuit system according to claim 6,
   wherein the read request packet information comprises the first code, the second code, the third code, the fifth code, and the sixth code,
   wherein the read response packet information comprises the first code, the third code, the fourth code, the fifth code, and the sixth code, and
   wherein the acknowledgement packet information comprises the first code, the third code, the fifth code, and a seventh code corresponding to whether an error has occurred.

8. The integrated circuit system according to claim 1, wherein the memory module comprises a dual in-line memory module (DIMM).

9. The integrated circuit system according to claim 3, wherein the accelerator performs at least one calculation among a sorting calculation, a searching calculation, a logic calculation and a four arithmetic calculation.

10. The integrated circuit system according to claim 3, wherein the accelerator performs a calculation operation by using written data, and outputs a result of performing the calculation operation as read data.

11. The integrated circuit system according to claim 3, wherein the protocol converter comprises:
    an input block suitable for receiving information from the host device;
    a packet decoder suitable for decoding the received information, and outputting a decoding result to a first path when the received information corresponds to the at least one memory device or a second path when the received information corresponds to the accelerator;
    a first conversion block suitable for generating and outputting command/address signals or data according to the second protocol, by using the decoding result of the first path;
    a second conversion block suitable for generating information for controlling the accelerator, by using the decoding result of the second path;
    a third conversion block suitable for generating information according to the first protocol, by using data according to the second protocol received from the at least one memory device;
    a fourth conversion block suitable for generating information according to the first protocol, by using information received from the accelerator; and
    an output block suitable for transmitting the information generated in the third and fourth conversion blocks, to the host device.

12. The integrated circuit system according to claim 11, wherein the packet decoder inspects validity of the received information, and outputs a validity inspection result.

13. An integrated circuit system comprising:
    a host device; and
    a memory module including at least one memory device and an accelerator, and suitable for:
    converting information according to a first protocol received from the host device, into information according to a second protocol and transferring the converted information to the memory devices; and
    converting information according to the second protocol outputted from the memory devices, into information according to the first protocol and transferring the converted information to the host device,
    wherein information transferred between the host device and the memory module comprises a write request packet information which requests a write operation, and wherein the write request packet information comprises a first code corresponding to a command, a second code corresponding to an address, a third code for checking validity, a fourth code corresponding to data, a fifth code corresponding to an identifier (ID) of packet information, and a sixth code indicating a source of the packet information.

14. The integrated circuit system according to claim 13, wherein the first protocol includes an asynchronous protocol, and the second protocol includes a synchronous protocol.

15. The integrated circuit system according to claim 13, wherein the accelerator comprises a circuit which is obtained by programming a field-programmable gate array (FPGA) chip.

16. The integrated circuit system according to claim 13, wherein the accelerator comprises a dedicated hardware accelerator which performs a predetermined function.

17. The integrated circuit system according to claim 13, wherein information transferred between the host device and the memory module further comprises a read request packet information which requests a read operation, a read response packet information which includes a read operation result, and an acknowledgement packet information which indicates whether an error has occurred or not.

18. The integrated circuit system according to claim 17,
wherein the read request packet information comprises the first code, the second code, the third code, the fifth code, and the sixth code, and
wherein the read response packet information comprises the first code, the third code, the fourth code, the fifth code, and the sixth code.

19. The integrated circuit system according to claim 18,
wherein the acknowledgement packet information comprises the first code, the third code, the fifth code, and a seventh code corresponding to whether an error has occurred.

* * * * *